May 6, 1947.  G. H. FOSS  2,420,130
APPARATUS FOR JACKING UP AND LOWERING MOTOR VEHICLE WHEELS
Filed Oct. 31, 1944
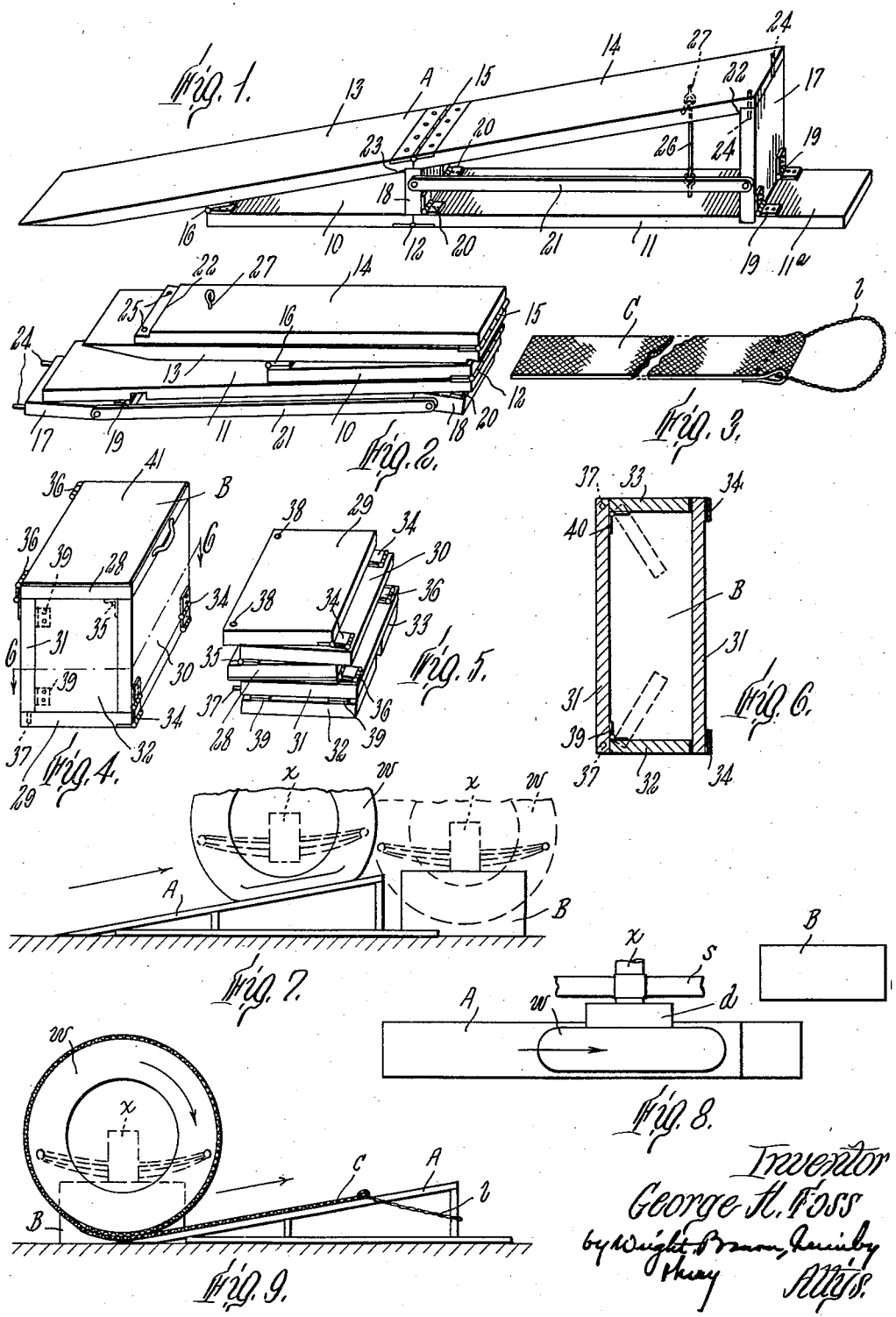
Inventor
George H. Foss Patented May 6, 1947

2,420,130

UNITED STATES PATENT OFFICE 2,420,130

APPARATUS FOR JACKING UP AND LOWERING MOTOR VEHICLE WHEELS

George H. Foss, Hamilton, Mass.

Application October 31, 1944, Serial No. 561,257

9 Claims. (Cl. 254—88)

The present invention relates to means for raising and holding off the ground one end of an axle of an automotive vehicle so that the wheel on the raised axle end, or the tire on such a wheel, can be changed; as when a tire is punctured and goes flat.

An important object of the invention is to enable the power of the engine of the vehicle to be used for thus raising, or "jacking up," the wheel of which substitution or repair is required; for which purpose I provide a ramp or inclined runway, adapted to be laid on the ground, and over which the wheel needing repair is run by travel of the vehicle, and a support on which a part of the axle (or, at need, some other part of the under structure of the vehicle) near to the wheel is caused to rest when the wheel has passed beyond the ramp, and by which the wheel is supported clear of the ground.

A further object is to provide, in conjunction with such a ramp and support, an effective but simple contrivance by which the engine power may be applied, when one of the propelling wheels is thus jacked up, to shift the weight of the vehicle from the support to the ramp, through the wheel; so that the wheel may then be lowered to the ground.

A further object is to provide a ramp and support made of articulated parts so constructed and coupled together that they can be folded into the form of compact bundles smaller in one dimension (two dimensions in the case of the ramp) than when extended for use, whereby they can be conveniently stowed in an available space in the vehicle body, and can be easily set up or extended for use, at any time when need of changing a tire or wheel occurs, and in any place.

The invention comprises the combination of a jacking up ramp and support with means for applying power from the engine to shift the jacked up weight from the support to the ramp, in generic scope; a foldable ramp and/or a foldable support such as are described in the following specification, and equivalents thereof; and a method of procedure according to which a jacked up driving wheel, driven by the engine of the vehicle, causes that part of the weight of the vehicle which is normally supported by that wheel to be transferred from the support to the ramp.

The drawings herewith show preferred embodiments of the mechanical features of the invention, and therein, Fig. 1 is a perspective view of a foldable ramp extended in condition for use;

Fig. 2 is a perspective view of the ramp folded up into the form of a bundle of less length and height than the extended dimensions of the ramp;

Fig. 3 is a perspective view of a tension member by which traction is effected between a jacked up driving wheel and the ramp in the operation of lowering the wheel to the ground;

Fig. 4 is a perspective view of a foldable support forming part of the jacking means;

Fig. 5 is a perspective view of the support folded into the form of a bundle of less height than that of the support when in condition for use;

Fig. 6 is a cross section of the support taken on a horizontal plane indicated by the line 6—6 of Fig. 4;

Figs. 7 and 8 are diagrammatic views, in elevation and plan respectively, illustrating the manner of jacking up a motor vehicle wheel by the apparatus here shown;

Fig. 9 is a diagrammatic elevation illustrating the means and procedure by which a jacked up driving wheel is lowered to the ground.

Like reference characters designate the same parts wherever they occur in all the figures.

The essential parts of the apparatus comprise a ramp, designated as a whole by the reference character A, a support designated as a whole by the reference character B, and a flexible traction member or tension member C. The ramp includes an under portion adapted to rest on the ground, and an upper inclined surface or runway which, when the ramp is in position for use, is substantially flush with the ground surface at its lower end and at a sufficient elevation above the ground at its upper end to serve the purpose later described.

The support B is provided to maintain the wheel above the ground after it has been driven up on the ramp and past the high end of the latter. For that purpose it has a base surface of sufficient length and breadth to afford a stable support when resting on the ground and a supporting top surface at a height above the base somewhat greater than the distance above the ground of the lowest point of the axle near the wheel when the wheel rests on the ground with its tire fully inflated. The length of the support is great enough, not only to give stability, but also to simplify the problem of placing the support so that it will receive the axle between the ends of its upper surface when the wheel has passed off from the support.

Use of this apparatus for jacking up the wheel of a motor vehicle when a punctured tire, or other accident, requires the tire or wheel to be changed, is illustrated by Figs. 7 and 8. The ramp is placed on the ground with its low end placed near to or extending partly underneath the tire of the wheel to be jacked up, and its length extending in the direction of the length of the vehicle. The support is placed on the ground somewhat beyond the high end of the ramp and inward therefrom toward the longitudinal middle of the vehicle. The vehicle may be then propelled by its own power to cause the wheel involved, designated $w$ in these figures, to roll up on the ramp and pass beyond its high end. When the wheel passes off from the ramp, the axle, or axle housing $x$ with which it is associated, drops on the support and is supported thereby with the under part of the wheel tire clear of the ground.

Either the front or rear wheel at either side of the vehicle may be jacked up in this manner. The illustration here given shows a rear wheel of a conventional automobile having an associated brake $d$, and a portion of the rear spring $s$ which underlies the axle housing $x$ and is secured thereto. In these particular circumstances the support is placed far enough away laterally from the ramp to insure that the spring attachment, and not the brake, will come to bear on its upper surface. When used for jacking up the front wheel of a vehicle having a depressed front axle, the support is placed so that the low part of the axle adjacent to the end nearest the wheel will repose on the support.

It will be apparent from the foregoing description that the engine of the vehicle furnishes the power necessary for elevating the wheel which needs repair and that part of the weight of the vehicle which is borne by the wheel, and that the muscular exertion of the driver is limited to that needed to place the ramp and support in position; and it is further evident that all the difficulties and inconveniences incident to placement of a jack of the kind with which automobiles are usually provided (often requiring the operator to lie on the ground in order to reach under the axle), are avoided entirely. This jacking up operation can be performed easily wherever the car happens to be when a tire goes flat, whether on a level road or a slope, and the jacked up corner of the chassis is then stably supported.

An exceedingly difficult problem solved by the present invention is that of lowering to the ground, or "unjacking," a driving wheel of the vehicle. The differential gearing through which automobile wheels are coupled with the engine causes any driving wheel which is clear of the ground to spin when the engine runs and deprives the other driving wheel or wheels of traction. In the solution of this problem I have provided the traction member C which is adapted to be interengaged between the ramp and raised driving wheel to furnish traction adequate for disengaging the axle from the support B and shifting the weight of the jacked up portion of the car to the ramp. This traction member, in the embodiment here shown, is a flexible band having a length substantially equal to, or somewhat greater than, the circumference of the inflated wheel tire plus the length of the ramp, and provided with a loop or bail $l$ attached to one end. The manner of its use is shown in Fig. 9.

It is laid on the inclined surface of the ramp with its loop $l$ embracing the higher end thereof, and it is passed, together with the lower end of the ramp, beneath the jacked up driving wheel $w$. It is also wrapped around the circumference of the wheel and its free end is tucked between the tire and the ramp, such free end being then embraced by an underlying part of the band. The band may be thus wrapped and drawn closely enough around the wheel to afford a frictional grip, by rotating the wheel manually while the band is slack, and pushing or drawing the low end of the ramp beneath the wheel, preferably far enough to exert pressure. The provision of sufficient length in the band to provide an overlap between the wheel tire and the ramp is important, as it insures a sufficiently powerful frictional grip between the band and the wheel tire to provide the necessary traction. The band may be made of strong woven fabric, such as is used for power belting, or it may be made of leather or other material. When made of fabric, it may be provided with a friction or skim coating of rubber. It is necessary that there be a substantial coefficient of friction between the rubber tire and the surface of a traction band used in the manner described, but not necessary for the development of the requisite friction that the band be rubber coated. The frictional quality which suffices for the transmission of power by a belt is sufficient for this purpose.

With the traction band applied in the manner thus described and illustrated, the engine of the vehicle is started and is coupled with the driving train. The initial rotation thereby imparted to the jacked up wheel causes the band to be pulled tightly around the circumference of the tire and to bind the wheel so firmly that the wheel cannot spin. That wheel, and the driving wheel on the ground, then apply traction such that the vehicle moves and the wheel $w$ travels up the ramp, raising the axle from the support B. The latter can then be removed and the wheel lowered to the ground by letting it roll down the ramp, or the vehicle can be propelled further in the original direction until the wheel drops from the high end of the ramp. The traction thus developed is amply sufficient to overcome the friction between the axle and the support existing before the first movement of the vehicle occurs.

As the stress applied to the band C during this action is parallel to the slope of the ramp, having a downward component, there is no tendency for the loop $l$ to be pulled upward and over the upper corner of the ramp, hence the mere embracement of the upper rear corner of the ramp by the loop is sufficient to couple the band securely thereto.

While the traction band having the particulars herein described is important as being the best means for the purpose, it is to be understood that traction elements of other designs and characteristics may be used, provided only they are capable of connecting the wheel with the ramp so that the wheel cannot spin, and so that the rotative force of the wheel is converted into a pull tending to draw the ramp under the wheel and thus, by reaction, causing the wheel to travel upward on the ramp. A relatively short travel is sufficient to remove the weight of the car entirely from the support B and permit the latter to be moved away from the axle.

The ramp, support, and traction member may be made in different sizes and dimensions for use with motor vehicles of different types, ranging from light pleasure cars to trucks of all capacities, and other large and heavy vehicles. In equipment which I have used frequently and successfully for jacking up the wheels of a one ton truck, the ramp has a length of about 5 feet, a height at the elevated end of 9 inches, and a width of base and runway of 8 inches. The support is 18 inches long, 10 inches high and 8 inches wide. The traction band has a width of 4 inches and a length of 12 feet. I have found that if the ramp is too steep, the resistance of a free wheel with a flat tire to rolling up on the ramp when propelled by the vehicle in motion, exerts so large a horizontal component of force as to displace the ramp, but that when the angle is 10° or less, no difficulty on that score is encountered. It is to be understood, however, that variations from the specific values herein given may be made without departing from the invention.

To facilitate stowage, so that the ramp and support can be carried by an automobile for use at any time in any place, I have constructed them of a number of parts so connected by hinged joints that they can be folded into reduced compass. The principles and details of the foldable structures here illustrated involve features of the invention for which I desire protection.

The base portion of the ramp is composed of two parts or panels 10 and 11 connected by a hinge 12 so located that the panels can be swung about the hinge axis in a downward direction with respect to the position they occupy in Fig. 1. The inclined runway is composed of two sections or panels 13 and 14 connected together by a hinge 15, and the panel 13 is coupled by a hinge 16 to one end of the base panel 10. Braces 17 and 18 are connected to the base panel 11 by hinges 19 and 20, respectively; the brace 17 being located to underlie and support the highest end of the ramp panel 14, and the brace 18 to underlie and support the joint between the two panels 13 and 14. Preferably the base panel extends beyond the location of the brace 17 and the supported end of the upper panel 14, providing a platform 11a in order to give stability, preventing the ramp from tilting up when the wheel, in mounting on it, is near the end, and just before it rolls off the end. The hinges 19 and 20 are disposed so that both braces can swing down in the same direction against the base panel 11. The braces are coupled together by a link or connecting rod 21 pivoted to them at such distances from their hinge pivots that they swing in unison from raised to lowered position. Shoulders 22 and 23 are formed in the panels 14 and 15, respectively, to abut against the braces when the latter are upright, and brace 17 carries on its free extremity dowels 24 adapted to enter sockets 25 in the end of the panel 14. In addition a hook 26 is connected with the base panel 11 and is disposed to enter an eye 27 carried by the inclined panel 14. Thus, by means of the shoulders, dowels and hook, the parts of the ramp are interlocked so that they form a rigid structure of which no part can shift relatively to any other part when subjected to the stresses of use.

In folding this structure to smaller compass, the hook 26 is released, the top panel 14 freed from the dowels 24 and turned over upon the panel 13, the braces 17 and 18 are laid down on the base panel 11, and the latter is swung about the hinge 12, the whole combination having been previously lifted or tipped over on its side. Then the folded ramp presents substantially the appearance shown in Fig. 2. Its length is reduced to about one half and its thickness to approximately the difference between the greatest height of the extended ramp and the combined thickness of four panels and one brace. Since, in the illustrated embodiment the panels are made of pieces of wooden boards one inch thick, the folded height is 5 inches plus whatever spaces between them may be caused by the presence of hinges, but it is within the scope of the invention to make these parts of thinner boards of adequately strong wood, or of metal plates thinner than wooden boards, whereby the folded height is still less. However, even in this illustration, the height is considerably reduced by folding. Of course the width remains the same.

The support B is conveniently made as a rectangular box with strong walls connected by hinges so that they can be laid flatwise on one another. As here shown, the box structure is formed of top and bottom walls 28 and 29, side walls 30 and 31 and end walls 32 and 33. The bottom wall 29 and side wall 30 are connected by double jointed hinges 34 so applied that the wall 30 can be set upright on a margin of the bottom wall 29 and swung outward and under the bottom wall. The top wall 28 overlies at one margin the upper edge of wall 30 and is connected to the latter by hinges 35 arranged to permit the top wall to fold against the inner surface of wall 30. The other side wall 31 is interposed between the top and bottom walls, is connected to the top wall 28 by double jointed hinges 36 and has dowels 37 protruding from its lower edge into sockets 38 in the margin of the bottom wall 29 opposite to that which supports wall 30. The hinges 36 are so disposed that the wall 31 can be swung outward and over the top wall 28. The end walls 32 and 33 are hinged to the side wall 31 at the ends of the latter by hinges 39 and 40. Their dimensions are equal to the height and width of the interior of the box so that, when located at right angles to the wall 31, they afford bracing support between the walls of both pairs; i. e., the pair composing the top and bottom walls 28 and 29 and the pair of side walls 30 and 31. These end walls can be swung inward to lie against the inner face of wall 31, as indicated by broken lines in Fig. 6. In folding to more compact form, the wall 31 is disengaged from wall 29 and folded back on the outer side of wall 28; the bottom wall 29 is folded back against the outer side of wall 30, and the walls 28 and 30 are brought together face to face by turning on the hinges 35. The steps of folding can be performed in other sequences than above described, but ultimately they result in bringing the walls 28 and 30 together face to face, the wall 29 against the outer face of wall 30, the wall 31 against the outer face of wall 28, and the end walls against what was before the inner face, and is now the outer face of wall 31. The height of the resulting package is less than that of the extended box, being equal to the combined thicknesses of five walls plus spaces due to the presence of the hinges. As here shown, the box walls are made of sections of one inch thick wooden boards, and the hinges can be inset into the wood so as to permit the walls to lie in face to face contact. Also the walls can be made of thinner pieces and a greater reduction of height thereby obtained with folding.

The box may be placed either side up to serve as a support in the manner previously described and it is a matter of choice whether the wall 28 is the top and 29 the bottom, or vice versa. However, when these walls are made of wood, the one which is selected to be the top is preferably armored with a plate 41 of steel or other suitably hard material, so as to prevent scoring and splintering of the wood by projections on the axle structure when the latter drops on the support in use, as described.

What I claim and desire to secure by Letters Patent is:

1. A jacking apparatus for motor vehicles comprising the combination of a ramp having a base portion for contact with the ground and an inclined runway for traverse by the wheel of a motor vehicle when such vehicle is advanced by its motive mechanism, an axle support disposed to receive and uphold the axle of such a vehicle when the wheel associated with such axle runs off the higher end of the ramp, the ramp being placeable with its lower end beneath the wheel upheld by said support, and a traction band having means for connection with the higher part of the ramp and otherwise free from connection therewith, the band extending thence beneath and around the wheel for frictional engagement with the wheel tire, said traction band being adapted to create traction between the wheel and ramp when the wheel is rotated by power in the direction tending to cause it to travel in the ascending direction along the ramp.

2. An apparatus for lowering the driving wheel of an automotive vehicle to the ground when such wheel is held clear of the ground by a support underlying the axle with which the wheel is associated, comprising a ramp adapted to be placed on the ground and having an inclined upper surface arranged to be placed substantially tangent to the under side of the tire of the raised wheel when the ramp rests on the ground, and a traction band having a connector at one end engageable with the higher part of the ramp and being of flexible material and of a length enabling it to pass along the ramp under the wheel and around the circumference of the wheel tire with underlap of its extremity between the tire and another portion of the band.

3. An appliance for use in lowering to the ground the driving wheel of an automotive vehicle when such wheel is held in raised position by a support underlying the adjacent axle of the vehicle, comprising a ramp having an under surface adapted to rest on the ground and an inclined upper surface adjoining an upright portion at its upper extremity, and a flexible band having a loop at one end adapted to embrace the upright terminal extremity of the ramp, said band being adapted to be placed with the lower extremity of the ramp beneath and tangent to the under side of the tire of the raised wheel and having a length enabling it to be wrapped around the circumference of the tire and to be overlapped at the under side of the tire by a portion of the band.

4. A foldable ramp for motor vehicle jacking purposes, comprising two base panels hinged together so that they can be extended in alinement with each other and folded face to face, a runway formed of two panels hinged together so that they can be extended in alinement and folded together face to face, one of said runway panels being hinged to the extremity of one of the base panels in a position such that the major portion of the two runway panels overlie the base panels, and braces between the base panels and runway panels disposed to support the latter at a prescribed inclination to the base panels, one of said braces being beneath the hinge joint of the runway panels and the other being beneath a more elevated portion of the runway.

5. A foldable ramp for motor vehicle jacking purposes, comprising two base panels hinged together so that they can be extended in alinement with each other and folded face to face, a runway formed of two panels hinged together so that they can be extended in alinement and folded together face to face, one of said runway panels being hinged to the extremity of one of the base panels in a position such that the major portion of the two runway panels overlie the base panels, and braces between the base panels and runway panels disposed to support the latter at a prescribed inclination to the base panels, one of said braces being beneath the hinge joint of the runway panels and the other being beneath a more elevated portion of the runway, said braces being hinged to the base in a manner permitting them to be placed upright and to be laid down against the base.

6. A ramp as set forth in claim 4, combined with a connecting rod in pivotal engagement with both braces at points equally distant from the hinge axes of the respective braces, whereby to compel movement of both braces in unison when either is raised or lowered.

7. A foldable ramp as set forth in claim 4, combined with a tie member interconnected detachably between the base and runway portions of the ramp when the runway is supported by the braces.

8. A ramp as set forth in claim 4, combined with a connecting rod in pivotal engagement with both braces at points equally distant from the hinge axes of the respective braces, whereby to compel movement in unison with both braces when either is raised or lowered, and a tie member adapted to be interconnected between the base and runway portions of the ramp when the braces are in their upright operative positions, whereby to prevent collapse of the ramp structure under the stresses of use.

9. A jacking apparatus for motor vehicles comprising a foldable ramp having two base panels hinged together so that they can be extended in alinement with each other and folded face to face, a runway formed with two panels hinged together so that they can be extended in alinement and folded into superposed relation, one of said runway panels being hinged to the extremity of one of the base panels in a position such that the major portion of the runway panels overlie the base panels, and displaceable braces between the base panels and the runway panels disposed to support the latter at a prescribed inclination to the base panels, combined with an axle support disposed to receive and uphold an axle of such a vehicle when the wheel associated with such axle runs off the higher end of the alined runway panels, the ramp being placeable with the lower end of its alined runway panels beneath the wheel upheld by said support, and a traction band having a loop at one end adapted to embrace and engage one of said braces when the band is laid lengthwise along the runway panels, the band having a length sufficient to wrap around the tire of said wheel and to be overlapped on that part of the band which extends between the wheel and the ramp.

GEORGE H. FOSS.

REFERENCES CITED

The following references are of record in the file of this patent:

UNITED STATES PATENTS

| Number | Name | Date |
|---|---|---|
| 1,871,129 | Pierce | Aug. 9, 1932 |
| 2,232,903 | Day | Feb. 25, 1941 |
| 1,647,935 | Scholler | Nov. 1, 1927 |
| 1,855,949 | Dubroca | Apr. 26, 1932 |
| 1,961,873 | Edmonds | June 5, 1934 |
| 2,029,489 | Kohl | Feb. 4, 1936 |